(12) United States Patent
Dallas et al.

(10) Patent No.: US 10,012,953 B2
(45) Date of Patent: Jul. 3, 2018

(54) METHOD OF RECONSTRUCTING A HOLOGRAPHIC IMAGE AND APPARATUS THEREFOR

(71) Applicants: CANON KABUSHIKI KAISHA, Tokyo (JP); The Arizona Board of Regents on behalf of the University of Arizona, Tucson, AZ (US)

(72) Inventors: William J Dallas, Tucson, AZ (US); Chung-Chieh Yu, Tucson, AZ (US); Isao Matsubara, Utsunomiya (JP)

(73) Assignees: Canon Kabushiki Kaisha, Tokyo (JP); THE ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 1095 days.

(21) Appl. No.: 13/712,787

(22) Filed: Dec. 12, 2012

(65) Prior Publication Data

US 2013/0148183 A1     Jun. 13, 2013

Related U.S. Application Data

(60) Provisional application No. 61/569,958, filed on Dec. 13, 2011, provisional application No. 61/637,772, filed on Apr. 24, 2012.

(51) Int. Cl.
*G03H 1/22* (2006.01)
*G03H 1/08* (2006.01)
*G03H 1/04* (2006.01)

(52) U.S. Cl.
CPC ......... *G03H 1/2202* (2013.01); *G03H 1/0443* (2013.01); *G03H 1/0866* (2013.01);
(Continued)

(58) Field of Classification Search
CPC ................. G03H 1/22; G03H 1/2202; G03H 2001/0456; G03H 1/0443; G03H 1/0825;
(Continued)

(56) References Cited

U.S. PATENT DOCUMENTS 3,971,065 A    7/1976   Bayer
2008/0266564 A1*   10/2008   Themelis .............. G01J 3/2823
                                                                           356/419

OTHER PUBLICATIONS

Chen et al ("Numerical reconstruction and twin-image suppression using an off-axis Fresnel digital hologram", Applied Physics B, vol. 90, pp. 527-532 (Jan. 19, 2008).*
(Continued)

*Primary Examiner* — Stephone B Allen
*Assistant Examiner* — Jyotsna Dabbi
(74) *Attorney, Agent, or Firm* — Canon USA Inc., IP Division

(57) ABSTRACT

An apparatus for, and method of, image reconstruction. The method includes first breaking a holographic image into a plurality of interlaced sample sets corresponding to color separation images; and independently sampling, filtering, and reconstructing all sets. The resulting demodulated images contain no fringes. Notably, range-clipped tonal rendering curves are used to choose pixel regions of the demodulated images that will replace saturated regions. The image is reconstructed by integrating all un-saturated images into one.

9 Claims, 13 Drawing Sheets

(52) U.S. Cl.
CPC ............... *G03H 2001/0456* (2013.01); *G03H 2001/0825* (2013.01); *G03H 2001/2263* (2013.01); *G03H 2210/13* (2013.01)

(58) Field of Classification Search
CPC ............. G03H 2210/13; G03H 1/0866; G03H 2001/2263
USPC .......................................................... 359/32
See application file for complete search history.

(56) References Cited

OTHER PUBLICATIONS

Yamaguchi et al (Phase shifting color digital holography, Optics Letters, vol. 27, No. 13, Jul. 1, 2002, pp. 1108-1110).*
Zhang et al, Estimation of saturated pixel values in digital color imaging (JOSA, vol. 21, No. 12, Dec. 2004, pp. 2301-2310).*
Cuche et al (Appl. Optics, vol. 39, No. 23, Aug. 10, 2000, pp. 4070-4075).*
Reinhard et al., "High dynamic range imaging: acquisition, display, and image-based lighting", Amsterdam: Elsevier/Morgan Kaufmann, 2006, p. 7.
Bell et al., "Conference Record of the Forty-First Asilomar Conference on Signals, Systems & Computers," Nov. 4-7, 2007, Pacific Grove, California, Edited by Michael B. Matthews, ATK Mission Research, In Cooperation With: The Naval Postgraduate School, Monterey, California, ATK Mission Research, Monterey, California and Technical Co-Sponsor, The IEEE Signal Processing Society.
"High Dynamic Range Microscope, "HDR" Digital Microscopes, PC Digital Microscope" Webpage (http://www.hirox-usa.com/products/microscope/kh7700_07.html), Hirox-USA, May 28, 2013, pp. 1-4.
Goodman et al., "Digital image formation from electronically detected holograms", Appl. Phys. Lett. 11, 77-79 (1967).
Coquoz et al., Microendoscopic holography with flexible fiber bundle: experimental approach, Progress in Biomedical Optics 2083, 314-8 (1993) SPIE vol. 2132, pp. 466-474.
Carl et al., "Parameter-optimized digital holographic microscope for high-resolution living-cell analysis," Appl. Opt. 43, 6536-44 (2004), pp. 6536-6544.

* cited by examiner

METHOD OF RECONSTRUCTING A HOLOGRAPHIC IMAGE AND APPARATUS THEREFOR

CROSS REFERENCE TO RELATED APPLICATIONS

This application claims priority from Provisional Application No. 61/569,958 filed Dec. 13, 2011, and Provisional Application No. 61/637,772 filed Apr. 24, 2012 the disclosures of which are hereby incorporated by reference herein in their entirety.

BACKGROUND OF THE INVENTION

Field of the Invention

The present invention relates to holographic imaging, and more in particular it relates to a method of reconstructing a holographic image and an apparatus therefor.

Description of the Related Art

In image processing, computer graphics, and photography high dynamic range imaging (HDRI or just HDR) form a set of techniques that allow a greater dynamic range of luminance between the lightest and darkest areas of an image than current standard digital imaging techniques or photographic methods. This wide dynamic range allows HDR images to more accurately represent the range of intensity levels found in real scenes, ranging from direct sunlight to faint starlight.

In general terms, HDR imaging includes a range of techniques geared toward representing more contrast in pictures. More specifically, conventional Non-HDR cameras take pictures at a single exposure level with a limited contrast range. This results in the loss of detail in bright or dark areas of a picture, depending on whether the camera had a low or high exposure setting. HDR imaging compensates for this loss of detail by taking multiple pictures of the same scene at different exposure levels and stitching them together so as to eventually arrive at a picture that is representative in both dark and bright areas. Further details related to HDR imaging can be found in an article by Reinhard, Erik; Ward, Greg; Pattanaik, Sumanta; Debevec, Paul: "High dynamic range imaging: acquisition, display, and image-based lighting", Amsterdam: Elsevier/Morgan Kaufmann. p. 7, ISBN 978-0-12-585263-0, 2006 (hereinafter "Reference 1").

The characteristics of a camera need to be taken into account when reconstructing high dynamic range images. These characteristics are mainly related to gamma curves, sensor resolution, and noise. Light sensors and emitters try to mimic a scene's light signal concerning human perception; it is the human perception that is important concerning colors reproduction. Inspired on the trichromatic base of the human eye, the standard solution adopted by industry is to use red, green, and blue filters, referred as RGB base filters, to sample the input light signal and also to reproduce the signal using light-based image emitters. This employs an additive color model, as opposed to the subtractive color model used with printers, paintings, etc.

Common construction of digital color sensors uses a sensor with panchromatic sensitivity combined with a patterned color-pixel filter. The Bayer filter, which is named for Bryce E. Bayer the inventor of U.S. Pat. No. 3,971,065 (hereinafter "Reference 2"), is representative of the patterned color-pixel filter. In a Bayer filter, there are four sensor pixels per color referred to as a "macro-pixel".

In HDR-Microscopy, it has been noted that the exposure of image micro-holograms varies in a similar fashion to that of a photograph. Specifically, there are large amplitude variations in the hologram, e.g., from non-uniform illumination or lensing effects of the object, that can saturate the detector locally. Saturation causes loss of image amplitude and ultimately image deterioration. Damage of the fringe structure causes loss of the image phase information. Further details concerning HDR-microscopy can be found in an article by Bell, A. A., Meyer-Ebrecht, D., Bocking, A., Aach, T., "HDR-Microscopy of Cell Specimens: Imaging and Image Analysis", Systems and Computers, 2007 Record of the Forty-First Asilomar Conference, ACSSC 2007 (hereafter "Reference 3").

As described in Reference 3, a patterned color-pixel filter as disclosed by Reference 2 can be useful in HDR-microscopy in a different way. Specifically, by using a green laser diode, the green absorption of the different color filters allows the sensor to record data in different illumination ranges. In a 14 bit single chip Bayer color filter camera, the potential dynamic range extension beyond the camera's nominal 14 bits is log $2(18.2)=4.2$. The total range is approximately 18 bits. This range is the equivalent of 262144 gray levels. FIG. 2A illustrates the pixel sensitivities of an RGB Bayer filter to green light. In FIG. 2A, relative irradiance required to achieve a given output level for the Green, Red and Blue channels of the patterned color-pixel filter is seen to overlap.

SUMMARY OF THE INVENTION

In view of the above background, the inventors herein have used a shifted-sample version of the Whitaker-Shannon Sampling Theorem to eliminate distortions in holographic images. Specifically, using a holographic image, the hologram is first divided into four interlaced sample sets corresponding to the color separation images. Then, each set is independently sampled, filtered, and reconstructed to thereby process all four sets. The resulting demodulated images contain no fringes. Range-clipped tonal rendering curves are used to selectively choose pixel regions that will replace saturated regions.

According to an aspect of the present invention, an image reconstructing method comprises: forming an interference pattern by interference of a reference beam and an object beam, the object beam including information about an object; detecting the interference pattern with a detector having a plurality of regions; each region including at least a first sub-region and a second sub-region of which sensitivities are different from each other, first forward Fourier transforming a first data set which is detected by a plurality of the first sub-regions of the detector to obtain a first Fourier spectrum including a first-order diffracted light; first inverse Fourier transforming the first-order diffracted light of the first Fourier spectrum to obtain a first amplitude data for each of the first and second sub-regions; second forward Fourier transforming a second data set which is detected by a plurality of the second sub-regions of the detector to obtain a second Fourier spectrum including a first-order diffracted light; second inverse Fourier transforming the first-order diffracted light of the second Fourier spectrum to obtain a second amplitude data for each of the first and second sub-regions; forming a first image by using the first amplitude data for each of the first and second sub-regions, a first portion of the first image having an amplitude value more than a threshold value being removed from the first image; forming a second image by using the second amplitude data for the first portion; and forming a reconstructed image of the object by using the first and second images.

Further features of the present invention will become apparent from the following description of exemplary embodiments with reference to the attached drawings.

DESCRIPTION OF THE EMBODIMENTS

Figure 1:
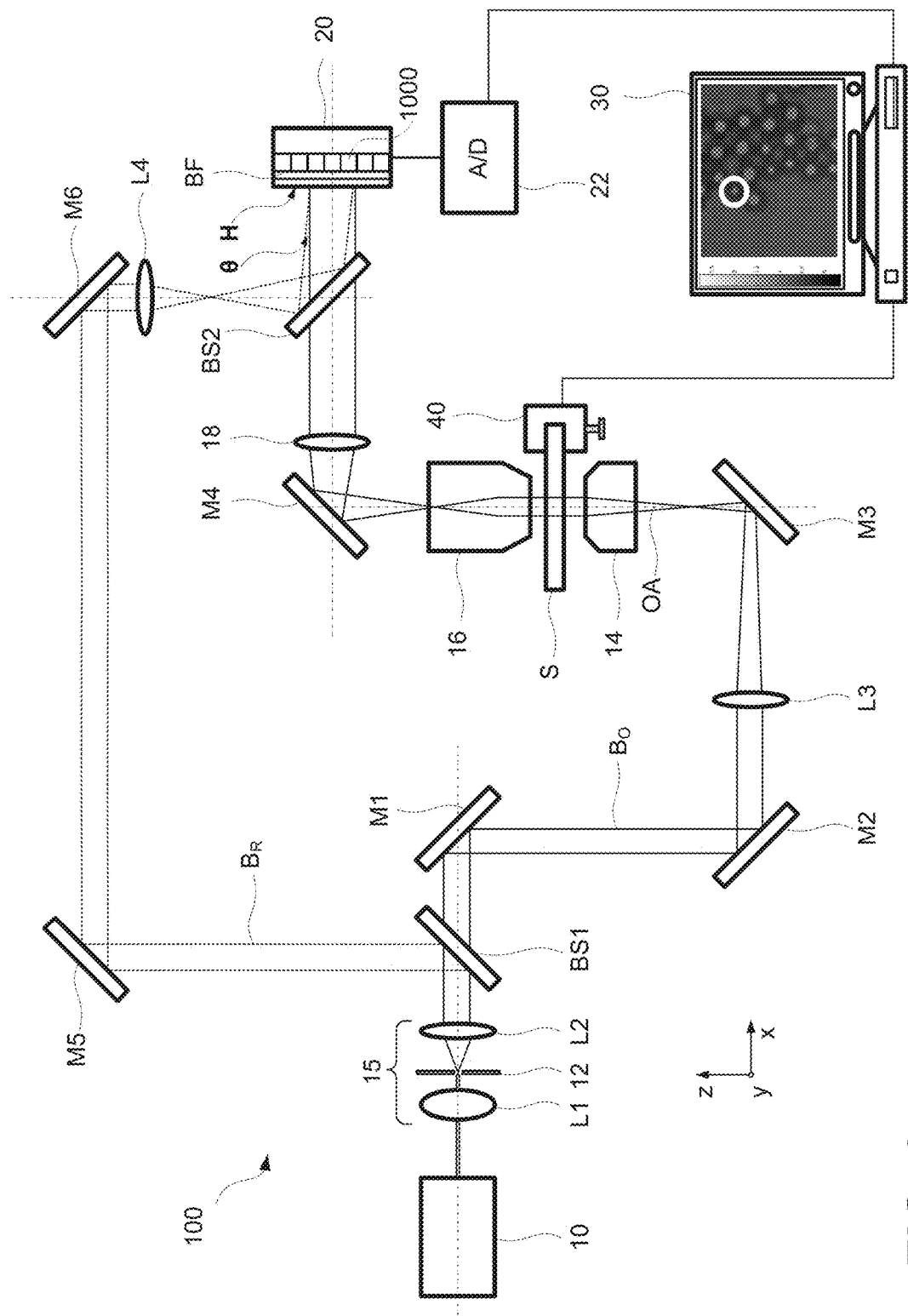
FIG. 1 is a diagram that illustrates an arrangement of an optical apparatus for obtaining holographic images of a sample, and for performing image reconstruction on the image of a sample, according to a first embodiment of the present invention.

Embodiments according to the present invention will be described below with reference to the attached drawings. In referring to the description, specific details are set forth in order to provide a thorough understanding of the examples disclosed. In other instances, well-known methods, procedures, components and circuits have not been described in detail as not to unnecessarily lengthen the present disclosure. Some embodiments of the present invention may be practiced on a computer system that includes, in general, one or a plurality of processors for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse or pointing device) for communicating user input information and command selections to the processor.

As will be appreciated by those skilled in the art, at least part of the present examples may be embodied as a system, method or tangible (non-transitory) computer-readable medium storing a program product. Accordingly, some examples may take the form of an entirely hardware embodiment, and entirely software embodiment (including firmware, resident software, micro-code, etc.), or an embodiment combining software and hardware aspects that may all generally be referred herein as a "unit", "module" or "system". Further, some embodiments may take the form of a computer program product embodied in any tangible medium having computer-readable program code stored therein. For example, some embodiments or processes described below with reference to flowchart illustrations and/or block diagrams of methods, apparatus (systems) and computer program products can be implemented by computer program instructions. The computer program instructions may include specific executable instructions of algorithms or processes stored in computer-readable media that when read by a computer can direct the computer or other programmable device to function in a particular manner to implement the function/act/step specified in the flowchart and/or block diagram.

As used herein, all terms should be accorded the ordinary and customary meaning in the light and context of the specification, as understood by persons of ordinary skill in the art to which the present application pertains. Certain terms may be accorded a more specific meaning in the specific context of the present application. For example, the term "radiation" or "light" as used herein may preferably refer to electromagnetic radiation including the visible, near-infrared (NIR), infrared (IR), and ultraviolet (UV) ranges. In addition, radiation or light may also refer to cosmic or high-energy particle radiation. That is, as used herein, radiation or light may also include α rays, β rays, γ rays emitted by radiation decay, X-rays, particle beams, cosmic rays, and others. Turning now to the drawings, where like reference numerals refer to like parts, exemplary embodiments of the invention are described.

FIG. 1 is a diagram that illustrates an arrangement of an optical apparatus 100 for obtaining holographic images of a sample S (object), and for performing image reconstruction with HDR, according to an embodiment of the present invention. As illustrated in FIG. 1, apparatus 100 includes a radiation source 10, an interferometer, a radiation detector 20, and a computer 30 (processor). The radiation source 10 may be implemented, for example, by a known radiation source, such as laser device which may generate a coherent (monochromatic) radiation beam at a desired wavelength. In alternate embodiments, the radiation source 10 may also be implemented by a non-coherent radiation source, such as a mercury or tungsten lamp, combined with a filter that can select a desired substantially monochromatic wavelength or wavelengths within a predetermined bandwidth. In further embodiments, the radiation source 10 may be implemented by a high-energy radiation source, such as an x-ray source, or the like. In a practical example, the inventors herein have used a Helium-Neon laser emitting a coherent (monochromatic) radiation beam with a wavelength of 543 nanometers (nm). The radiation beam emitted from the light source 10 passes through a spatial filter 15, which consists of a first lens L1, a pinhole 12 and a second lens L2. The radiation beam from the light source 10 is collimated and size-controlled by the spatial filter 15, and then it is split by a beam splitter BS1 into an object beam $B_O$ (object beam) and a reference beam $B_R$ (reference beam). Accordingly, both the object beam $B_O$ and the reference beam $B_R$ are preferably generated with the same parameters, such as phase, amplitude, wavelength, etc. More preferably, each of the object beam $B_O$ and the reference beam $B_R$ may be controlled with additional optics to have appropriate intensity, polarization, etc. to generate appropriate interference patterns at an image plane H.

One arm of the interferometer includes an object beam path, and the other arm of the interferometer includes a reference beam path. The object beam path extends from the beam splitter BS1 to an image plane H (hologram plane); and it includes a first Mirror M1, a second mirror M2, a third lens L3, a third mirror M3, condenser lens 14, an objective lens 16, a fourth mirror M4, a tube lens 18, and a second beam splitter BS2. Along the object beam path, the object beam $B_O$ is collimated and its diameter size is controlled by a 4-f lens relay system. The 4-f lens relay system includes the third lens L3 and the condenser lens 14; the third lens L3 is disposed between the second mirror M2 and the third mirror M3, but may be also located elsewhere along the object beam path. With the appropriate beam size and collimation, the object beam $B_O$ travels through the sample S (object). As the object beam $B_O$ travels through the sample S, the object beam $B_O$ interacts with the sample so that the sample modulates the wavefront of the object beam $B_O$ and a sample-modulated signal (sample image) is formed therein. The sample-modulated signal is subsequently magnified and projected onto the radiation detector 20 via the objective lens 16 and the tube lens 18. The radiation detector 20, in the present embodiment, includes a patterned color-pixel filter BF (e.g., Bayer filter) and sensor 1000. The sensor 1000 may be implemented by a charge-coupled-device (CCD) sensor, a complementary metal oxide semiconductor (CMOS) sensor, a holographic film plate (e.g., silver halide film), or the like.

The reference beam path extends from the beam splitter BS1 to an image plane H; and it includes a fifth mirror M5, a sixth mirror M6, a fourth lens L4, and the beam splitter BS2. Thus, the reference beam $B_R$ freely travels unobstructed along the reference beam path from the beam splitter BS1 to the image plane H. In other words, the reference beam $B_R$ does not interact with the sample, but travels from beam splitter BS1 to beam splitter BS2 unobstructed to be projected thenceforth onto the radiation detector 20. The size and the wavefront shape (curvature) of the reference beam $B_R$ are controlled by the fourth lens L4 to match the size and the wavefront shape (curvature) of the object beam $B_O$ at the image plane H of the radiation detector 20. More specifically, after the reference beam $B_R$ is guided towards the radiation detector 20 by the beam splitter BS2, the reference beam $B_R$ and the object beam $B_O$ are overlapped at the image plane H. In order to ensure an off-axis configuration, the reference beam $B_R$ is controlled to be incident on the image plane H at a controlled angle $\theta$. The angular tilt, represented by angle $\theta$ in FIG. 1, between the object beam $B_O$ and the reference beam $B_R$, can be precisely adjusted, for example, by tilting the beam splitter BS2 in front of the radiation detector 20. In alternate embodiments, the object beam $B_O$ and the reference beam $B_R$ can overlap so that no angle is formed therebetween. In this case, it is considered that the object beam $B_O$ and the reference beam $B_R$ can form an interference pattern an in-line manner in the phase-shifting configuration.

At the image plane H, a combined beam, which results by overlapping the reference beam $B_R$ and the object beam $B_O$ at a predetermined angle $\theta$ therebetween, produces an interference pattern that is detected by the sensor of the radiation detector 20. Specifically, after the object beam $B_O$ passes through the sample, the wave fronts of the object and reference beams are joined by the beam splitter BS2 to interfere and create the hologram at the image plane H. The modulated interference fringes, which include information on the wavefront phase-change and information on amplitude variations (intensity) of the object beam, are acquired by the radiation detector 20 as images of an interference pattern for at least three spatial phases of the pattern. The detected images are digitized by an analog-to-digital converter 22 (or similar known hardware), and the digitized data representing the detected images are transferred to the computer 30, such as a specifically programmed general purpose computer, a distributed computing network, or the like. Data representing the detected images is then numerically processed by known image processing techniques to extract and output (e.g., display or print) the desired information included in the detected images. More specifically, using the digitally recorded hologram, the computer 30 acts as a digital lens and calculates a viewable image of the object wave front by using a numerical reconstruction algorithm.

In the context of the present application, the representative computer 30 may include at least a central processing unit, such as processor or microprocessor; one or more data storage units; inputting devices, such as a keyboard, mouse, a touch screen, or the like; and one or more output devices, such as a display device, a printing device, or the like.

In digital holographic microscopy (DHM), a microscope objective is used to collect the object-modulated wavefront. However, as the microscope objective is only used to focus light onto the sample and to collect light modulated by the sample, but not to actually form the image, the microscope may be replaced by a simple lens. Indeed, if a slightly lower optical resolution is acceptable, and as long as a holographic image can be formed, the microscope objective may be entirely removed.

Turning now to the specific challenges of processing the detected holographic images and extracting the desired information, it should be recalled the discussion in the Background section supra, in which it was noted that the exposure of micro-holograms varies in a similar fashion to that of a photograph. That is, there are large amplitude variations in the hologram, e.g., from non-uniform illumination or lensing effects of the sample (object), which can saturate the detector locally. Saturation causes loss of the image amplitude. Damage of the fringe structure causes loss of the image phase information. Even for phase objects, when recorded out of the image plane, defocus can lead to strong amplitude variations. Accordingly, one aspect of the present invention is directed to a technique that effectively increases the dynamic range of the detector and reduces image distortions to more effectively reconstruct the detected images.

Figure 2A:
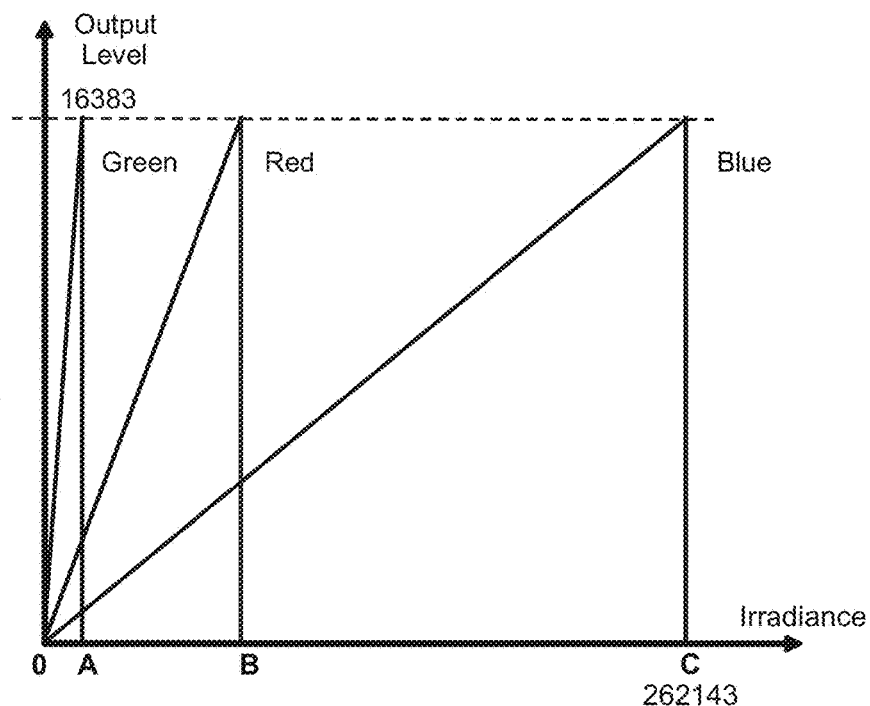
FIG. 2A is a graph illustrating relative pixel sensitivities of an RGB filter to green light.
Figure 2B:
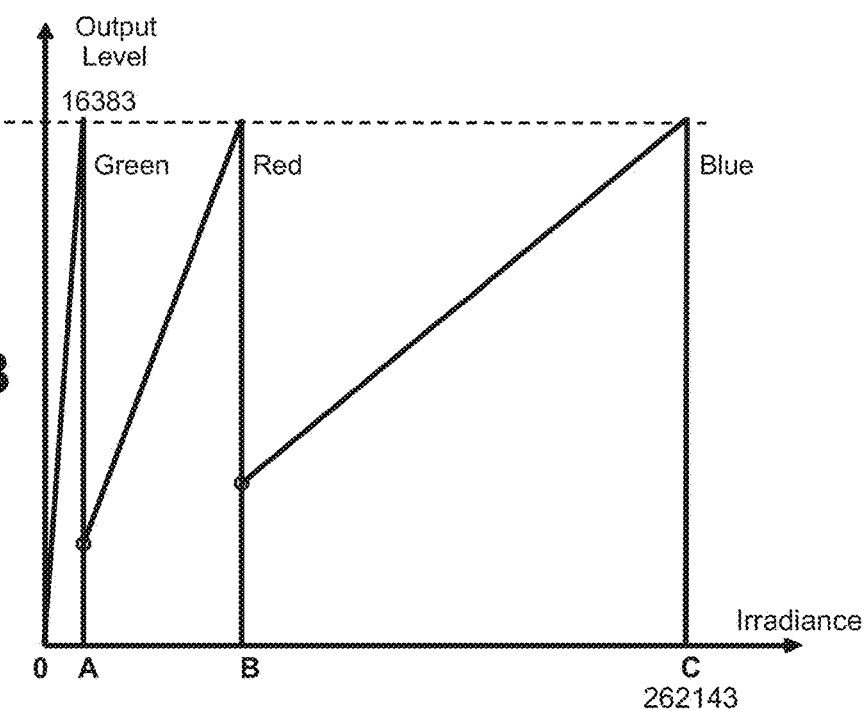
FIG. 2B is a graph illustrating range-clipped tonal rendering curves for an RGB filter under irradiance from green light.

Notably, the dynamic range of the detector 20 can be effectively increased by using a patterned color-pixel filter BF having relative pixel sensitivities as illustrated in FIG. 2A, in a manner similar to Reference 3. However, in accordance with the present embodiment, to eliminate distortions, a shifted-sample version of the Whitaker-Shannon Sampling Theorem is used to obtain Range-Clipped Tonal Rendering Curves, as illustrated in FIG. 2B. In addition, the recorded hologram is first broken into four interlaced sample sets corresponding to color separation images obtained by using each of the red (R), green 1 (G1), green 2 (G2), and blue (B) colors of the patterned color-pixel filter. Then, using numerical algorithms implemented by customized software, the computer 30 independently samples, filters, and reconstructs all four sets of images. The resulting demodulated images no longer contain fringes. Subsequently, the Range-Clipped Tonal Rendering Curves are used to choose pixel regions that will replace saturated regions. It is envisioned that the reconstruction method described herein is not limited to the use of four interlaced sample sets. Instead, depending on the level of accuracy desired, it is envisioned that optimal image reconstruction with high dynamic range can be provided even with as few as two interlaced sample sets. Naturally, more than four interlaced sample sets may also be applicable for higher fidelity.

Figure 3A:
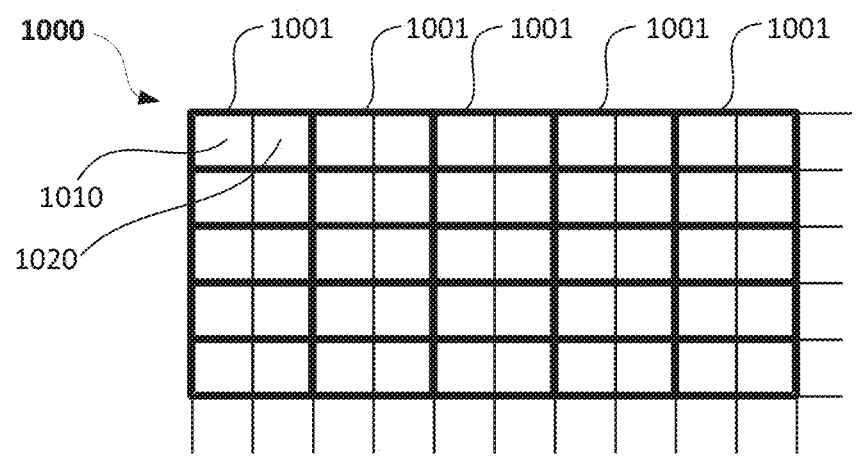
FIGS. 3A and 3B illustrate examples an image sensor having a plurality of regions and sub-regions thereof.
Figure 3B:
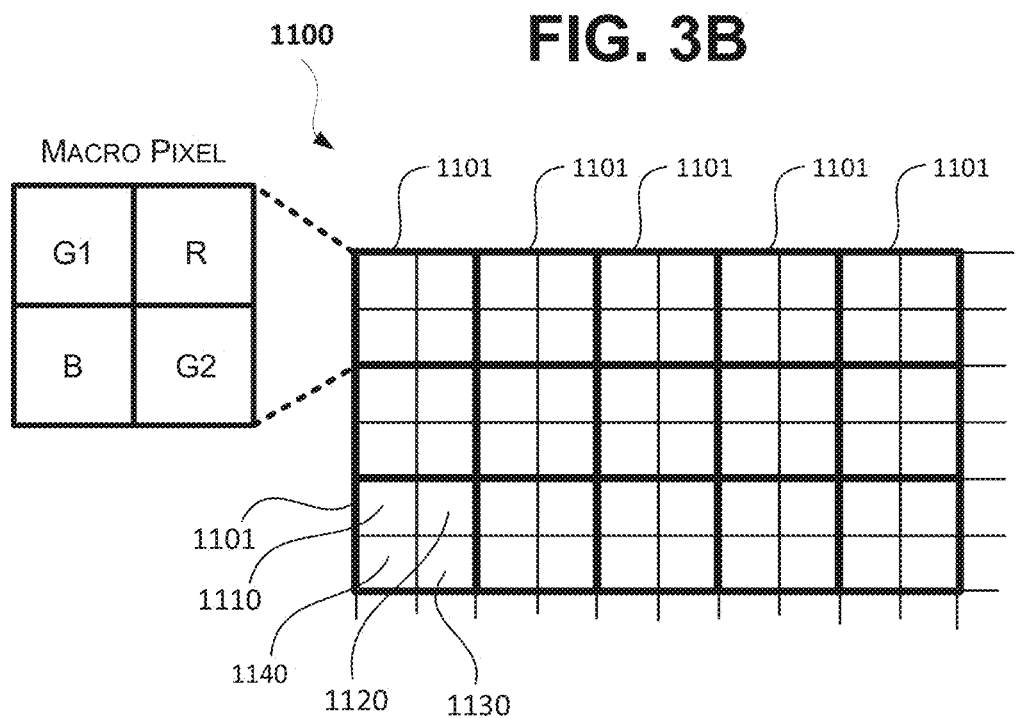

FIGS. 3A and 3B illustrate examples of a first image sensor 1000 and a second image sensor 1100. In FIG. 3A, the first image sensor 1000 includes a plurality of regions 1001, while in FIG. 3B the second image sensor 1100 includes a plurality of regions 1101. More specifically, as it is known to persons having ordinary skill in the art, image sensors can register the amount of light in predetermined levels from light to dark with no color information. A filter in front of the sensor allows the sensor to assign color tones to each pixel. The above-discussed Bayer filter, which has alternating rows of red-green and green-blue filters, is the most common RGB color filter. Another way to register color tones is to use the complementary colors—cyan (C), magenta (M) and yellow (Y)—combined with green filters to form a CMYG color array. Thus, FIG. 3B may represent a sensor 1100 using either a RGB or CMYG filter. On the other hand, FIG. 3A may represent a two-color filter, e.g., to register color tones in grayscale. In FIG. 3A, each of the regions (1001) includes two sub-regions (1010, 1020); and in FIG. 3B, each of the regions (1101) includes four sub-regions (1110, 1120, 1130, 1140). The sub-regions 1010 and 1020 in FIG. 3A, as well as the sub-regions 1110, 1120, 1130 and 1140 in FIG. 3B respectively correspond to different regions of a pattern color-pixel filter having a corresponding number of color sensitivities. In particular, as illustrated in FIG. 3B, the sub-regions 1110, 1120, 1130 and 1140 may correspond to a macro-pixel unit (a region) having alternating rows of green-red and blue-green filters. Accordingly, the sensitivity of each sub-region is different from each other.

According to the embodiments of the present invention, a method for acquiring single-shot high dynamic range images is described. A particular experimental realization is in the field of digital holographic microscopy, i.e. the imaging system includes magnification. However, this method can be applied to other applications. As discussed above, a common construction of digital color sensors uses a sensor with panchromatic sensitivity combined with a patterned filter color pixel filter. In a Bayer filter, for example, there are four sensor pixels per color "macro-pixel." The filter element arrangement is seen in FIG. 3B.

The sensor in the camera detector used for the images shown in the present application incorporates a filter of type discussed above. The illumination source is a green He—Ne laser (wavelength 543 nm). The color-dependent absorption of the different color filters allows the sensor to record data in different illumination ranges.

Spectra for Equalized and Interlace Reading: In equalized reading of holograms, the channels (Green1, Green2, Red, and Blue) are multiplied by factors that equalize their mean values. In this case, no resolution is lost but some pixels may be saturated. The differences in the Fourier spectra for equalized and interlaced images are graphically illustrated in FIGS. 4A and 4B, respectively. The interlaced sampling replicates the spectrum of FIG. 4A in FIG. 4B. Specifically, in FIG. 4B, the original first diffraction orders (+1, −1) are centered around the $0^{th}$ order with replicated diffracted orders (twin images) that repetitively occur further from the origin shown at the edges of FIG. 4B. Notably, due to interlacing and the repetitive nature of 1st order diffracted light, information on the whole region (macro pixel) can be obtained from a single sub-region. Therefore, when IFFT is performed, data for all sub-regions can be obtained.

Figure 4A:
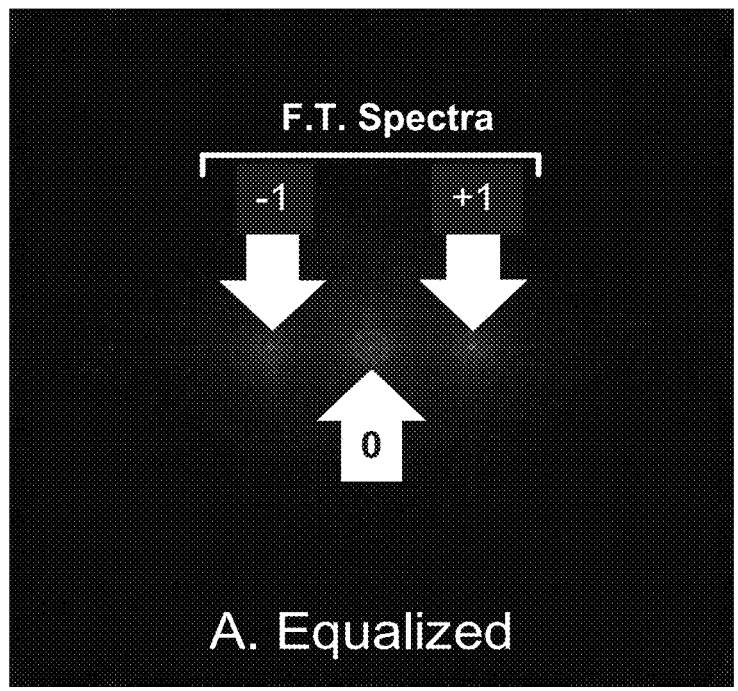
FIG. 4A illustrates a Fourier spectrum for equalized reading of a holographic image.

More specifically, in hologram demodulation, for off-axis holograms, the centers of the image Fourier spectrum and hologram Fourier spectrum are relatively displaced. A bandpass filter is used to select the image spectrum and reject that of the twin-image, the D.C. spike and the intermodulation noise. The sub-sampling that we use in HDR interpolation method generates more Fourier spectral component before filtering is done; for this reason care must be used to select the proper area for filtering. In FIG. 4A, the structure of the spectrum when only equalization is applied is seen. Here, the $+1^{st}$ diffraction order corresponds to the desired true image. Interlace sub-sampling the hologram results in the spectrum seen in FIG. 4B. The arrows indicate the diffraction orders generated by the sub-sampling but labeled as the original orders. The $+1^{st}$ order indicated by the arrow under the bypass (BP) filter is the target of the spatial filter. For bandlimited images, exact reconstruction is possible from discrete samples spaced by less than the Nyquist distance. These samples need not be centered on the origin, but instead may be laterally shifted as a group. In variation of the Whittaker-Shannon sampling theorem for 2D shifted samples, the sampling for a shift of (a,b) is expressed by $$u_s(x, y) = u(x, y) \frac{comb[(x - a)/\delta x]}{\delta x} \frac{comb[(y - b)/\delta y]}{\delta y}.$$

HDR Image Reconstruction from Shifted-Sample Sets: In the present embodiment, it is defined that $\delta x = \delta y$ represents the pitch (center-to-center spacing) of the sensor pixels, and $2\delta x$ represents the pitch of the macro-pixels. As long as the spatial-spectral width of the object satisfies the mathematical condition $\Delta \xi < 1/(2\delta x)$, the image of an object can be fully recovered (reconstructed) from any one of the four sample images $u_{sR}$, $u_{sG1}$, $u_{sG2}$, $u_{sB}$. The Nyquist bandwidth condition is guaranteed to be satisfied when the image comes from a consistent band-pass-filter demodulation of an image hologram. The reconstruction formula for the individual color-filtered images is a convolution of the sample image with an interpolation function. The classical interpolation function is a "sinc" function, but other may also be used.

Accordingly, the reconstructed red-filtered image obtained via the red channel of the RGB filter is given by Equation (1) below:

$$u_R(x, y) = \left[ \text{sinc}\left(\frac{x}{2\delta x}\right) \text{sinc}\left(\frac{y}{2\delta y}\right) \right] ** u_{sR}(x, y). \quad \text{Equation (1)}$$

Similar considerations are given to images obtained with Green1, Green2 and Blue channels of the RGB filter.

Considering that each "u" function for the reconstructed image is proportional to exposure, the exposure should be equalized and added to form the digital sensor values. As used herein, one example of "equalizing" is done by determining whether the irradiance value of a predetermined sub-region (pixel or group thereof) is higher than a given threshold; and when it is, the irradiance in that predetermined sub-region is replaced by the irradiance of a neighboring sub-region having an irradiance level below the given threshold. For example, when the irradiance value of green pixel G1>A, the irradiance value of that pixel would be replaced by a value of either R $\alpha_r$ or B $\alpha_b$. More specifically, because three distinct irradiance ranges are covered in this collection, they can be matched and added to form a HDR (high dynamic range) image. The HDR reconstruction formula is then given by Equation (2):

$$u_{HDR} = w_{G1} u_{G1} + w_{G2} u_{G2} + w_R u_R + w_B u_B \qquad \text{Equation (2).}$$

In Equation (2), the total image is a weighted sum of color-filtered images. One possible set of weighting functions, with truncated exposure ranges is shown in FIG. 2B. Accordingly, considering the truncated values (range-clipped) of FIG. 2B, the weighted function for the red channel can be given by Equation (3), as follows:

$$w_r(I) = \alpha_r I rect\left[\frac{\left(I - \frac{A+B}{2}\right)}{(B-A)}\right] \qquad \text{Equation (3)}$$

Where $\alpha$ (alpha) represents the slopes of the respective rendering curve in the figure (FIG. 2B), and "u" is proportional to exposure. Similarly, the weighted function for the blue channel may be given by Equation (3a), as follows:

$$w_b(I) = \alpha_b I rect\left[\frac{\left(I - \frac{A+C}{2}\right)}{(C-A)}\right]. \qquad \text{Equation (3a)}$$

For the irradiance values plotted in FIG. 2B, irradiance attenuations of $\alpha_{G1}=1$, $\alpha_{G2}=1$, $\alpha_R=5.06$, $\alpha_B=18.2$ were found for the Green1, Green2, Red and Blue channels of a Bayer RGB filter. It is envisioned that similar attenuation slopes can be found when a different color filter is used.

Figure 4B:
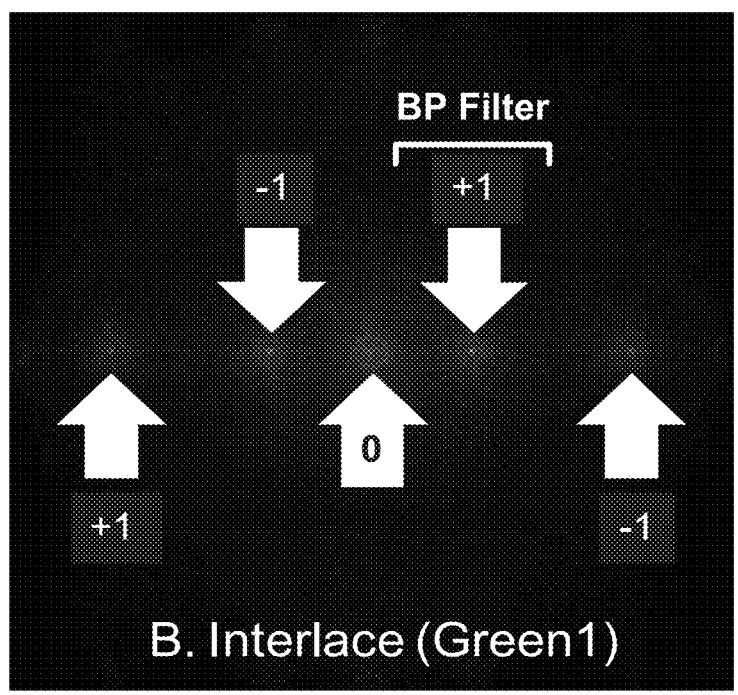
FIG. 4B illustrates interlaced sampling of the Fourier spectrum shown in FIG. 4A for HDR reading.

Because saturation is a nonlinear process, the order of operations becomes important. Decimating (removing) the pixels into the color-separation images then filtering can yield different results from filtering then decimating. In the present application, it is better to decimate first. For off-axis holograms, there is the additional consideration of demodulation. The centers of the image Fourier spectrum and hologram Fourier spectrum are relatively displaced. A bandpass (BP) filter is used to select the image corresponding to the F.T. spectrum and reject that of the twin-image, the D.C. spike and the intermodulation noise. The sub-sampling that is used here in the HDR interpolation method generates more Fourier spectral component before filtering is done. Accordingly, care must be used to select the proper area for filtering. In FIG. 4A it can be seen the structure of the spectrum when only equalization is applied. Specifically, in FIG. 4A, the +1st diffraction order corresponds to the desired true image. Interlace sub-sampling the hologram results in the spectrum seen in FIG. 4B. In FIG. 4B, the arrows indicate the diffraction orders generated by the sub-sampling but labeled as the original orders. The +1st order of the original spectra is the target of the spatial BP filter.

Turning now to FIGS. 5 to 8, an image reconstructing method is explained. An interference pattern is formed by a reference beam and an object beam. The object beam includes information (such as phase information and/or amplitude information) about an object. The interference pattern can be prepared by off-axis holography using the optical apparatus described in reference to FIG. 1.

Figure 5:
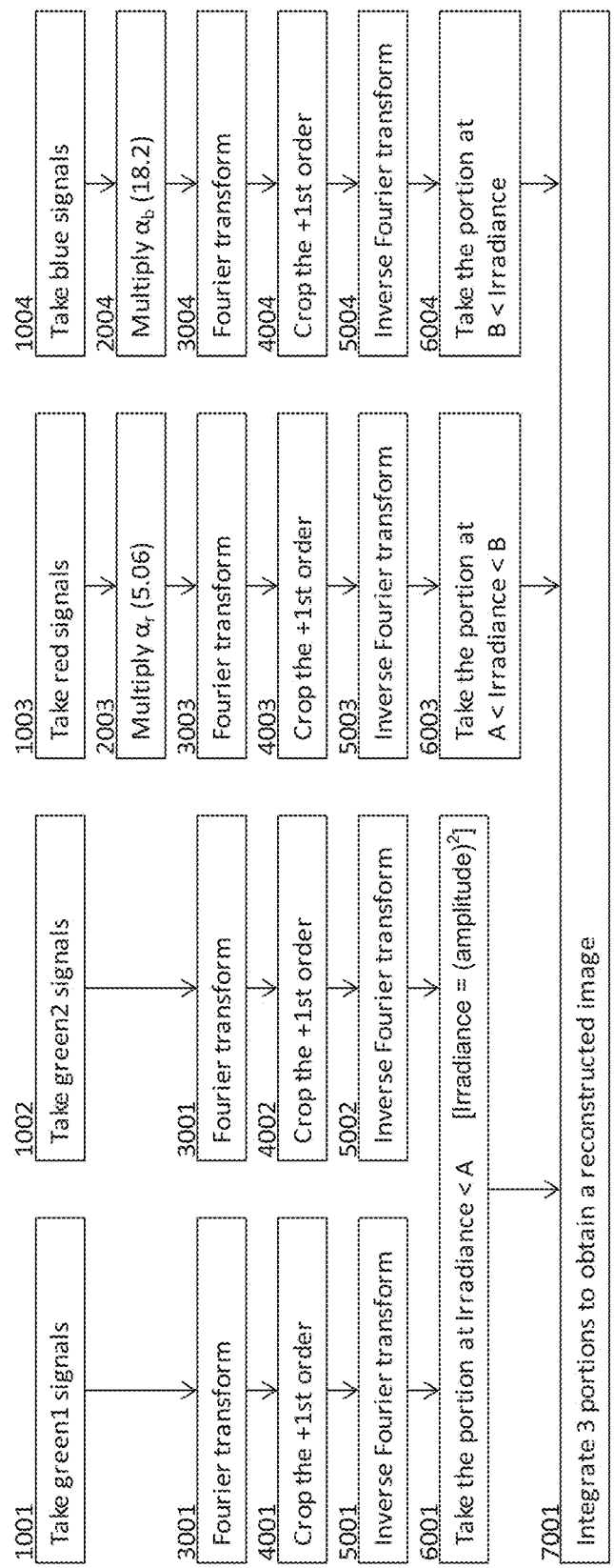
FIG. 5 illustrates a flowchart implemented by a microprocessor for HDR image reconstruction.

FIG. 5 illustrates a flowchart implemented by a microprocessor of computer 30 for HDR image reconstruction. As illustrated in FIG. 5, the process for HDR reconstruction includes: First, take green1, green2, red and blue signals from the detected data (Process 1001~1004). Second, multiply $\alpha_r$ to red signal (Process 2003), and multiply $\alpha_b$ to blue signal (Process 2004). Third, apply forward Fourier Transforming (FFT) on each signal separately (Process 3001~3004). Forth, crop the $1^{st}$ order for each signal separately (Process 4001~4004). Fifth, apply IFFT (inverse FFT) on each signal separately to reconstruct image for each signal (Process 5001~5004). Sixth, take the portion at Irradiance<A from green signals (Process 6001), and take the portion at A<Irradiance<B from red signal (Process 6003), and take the portion at B<Irradiance from blue signal (Process 6004). Seventh, integrate 3 portions to obtain a reconstructed image (Process 7001).

Figure 6:
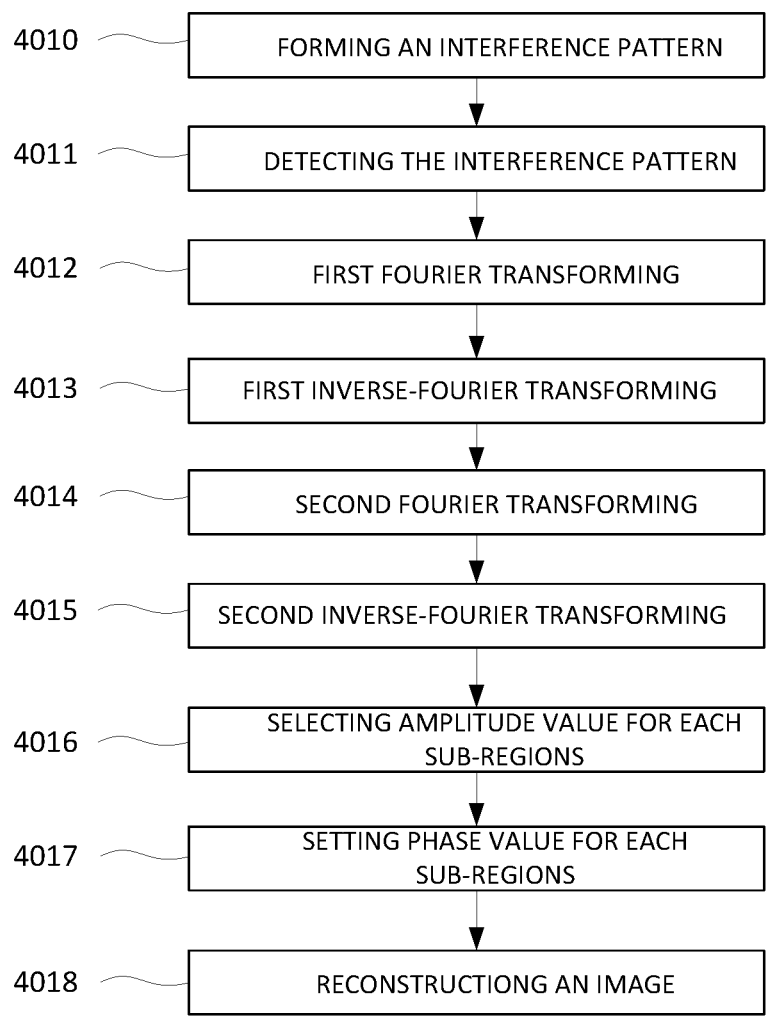
FIG. 6 is a flowchart exemplary illustrating an overview of an algorithm for HDR image reconstruction.

Turning now to FIG. 6, the image reconstructing method can be provided by the algorithm illustrated in the flow of the process steps therein. At least part of the steps 4010 through 4018 may be controlled by the processor of computer 30.

In step 4010, an interference pattern by a reference beam and an object beam is formed. The object beam includes information about an object.

In step 4011, the interference pattern is detected by a sensor 1000 of detector 30 (shown in FIG. 1). As illustrated and described with respect to FIGS. 3A and 3B, the sensor 1000 includes a plurality of regions. Each region includes at least a first sub-region and a second sub-region of which sensitivities are different from each other.

In step 4012, a first Fourier transforming is executed. A first data which is detected by a plurality of the first sub-regions (pixels or groups thereof) of the detector 1000 will undergo a fast Fourier transform process, in order to obtain a first Fourier spectrum including a first-order diffracted light.

In step 4013, a first inverse Fourier transforming (IFFT) is executed. The first-order diffracted light of the first Fourier spectrum is transformed to obtain a first amplitude data and a first phase data for each of the first and second sub-regions. Here, irradiance=(amplitude)$^2$ is used.

In step 4014, a second Fourier transforming is executed. A second data which is detected by a plurality of the second sub-regions of the detector will be transformed, in order to obtain a second Fourier spectrum including a first-order diffracted light.

In step 4015, a second inverse-Fourier transforming is executed. The first-order diffracted light of the second Fourier spectrum will be transformed to obtain a second amplitude data and a second phase data for each of the first and the second sub-regions.

In step 4016, one amplitude value will be selected from a group of the first and second amplitude data for each of the first and second sub-regions.

In step 4017, one phase value, which is associated with the one amplitude value selected from the group of the first and second amplitude data, is set from a group of the first and second phase data for each of the first and second sub-regions.

In step 4018, an image of the object is reconstructed based on the set phase value for each of the first and second sub-regions.

In the flow process of FIG. 6, when each region of the detector includes more than two sub-regions; i.e., a third sub-region (1140 in FIG. 3B), the following steps can be executed after step 4015 and before step 4016. First, a third Fourier transforming step of third data which is detected by a plurality of the third sub-regions of the detector, in order to obtain a third Fourier spectrum including a first-order diffracted light. Then, a third inverse-Fourier transforming step of the first-order diffracted light of the third Fourier spectrum to obtain a third amplitude data and a third phase data for each of the first, second, and third sub-regions.

In step 4016, one amplitude value from a group of the first, second, and third amplitude data can be selected for each of the first, second, and third sub-regions. In step 4017, one phase value, which is associated with the one amplitude value selected from the group of the first, second, and third amplitude data, can be set from a group of the first, second, and third phase data for each of the first and second sub-regions. In step 4018, the image of the object can be reconstructed based on the set phase value for each of the first, second and third sub-regions. The each region can include a fourth sub-region (1130 in FIG. 3B).

Naturally, the flow process of FIG. 6 is applied once for each pixel region (or macro pixel). Therefore, depending on the number of sub-regions present in each region, the flow process can be applied to any number of sub-regions with the understanding that each sub-region may correspond to either a pixel of a specific color or a group thereof. For example, when each region (macro pixel) includes four sub-regions (pixels) as shown in FIG. 3B, the fast Fourier Transform and inverse Fourier Transform steps are performed for each sub-region.

Figure 7:
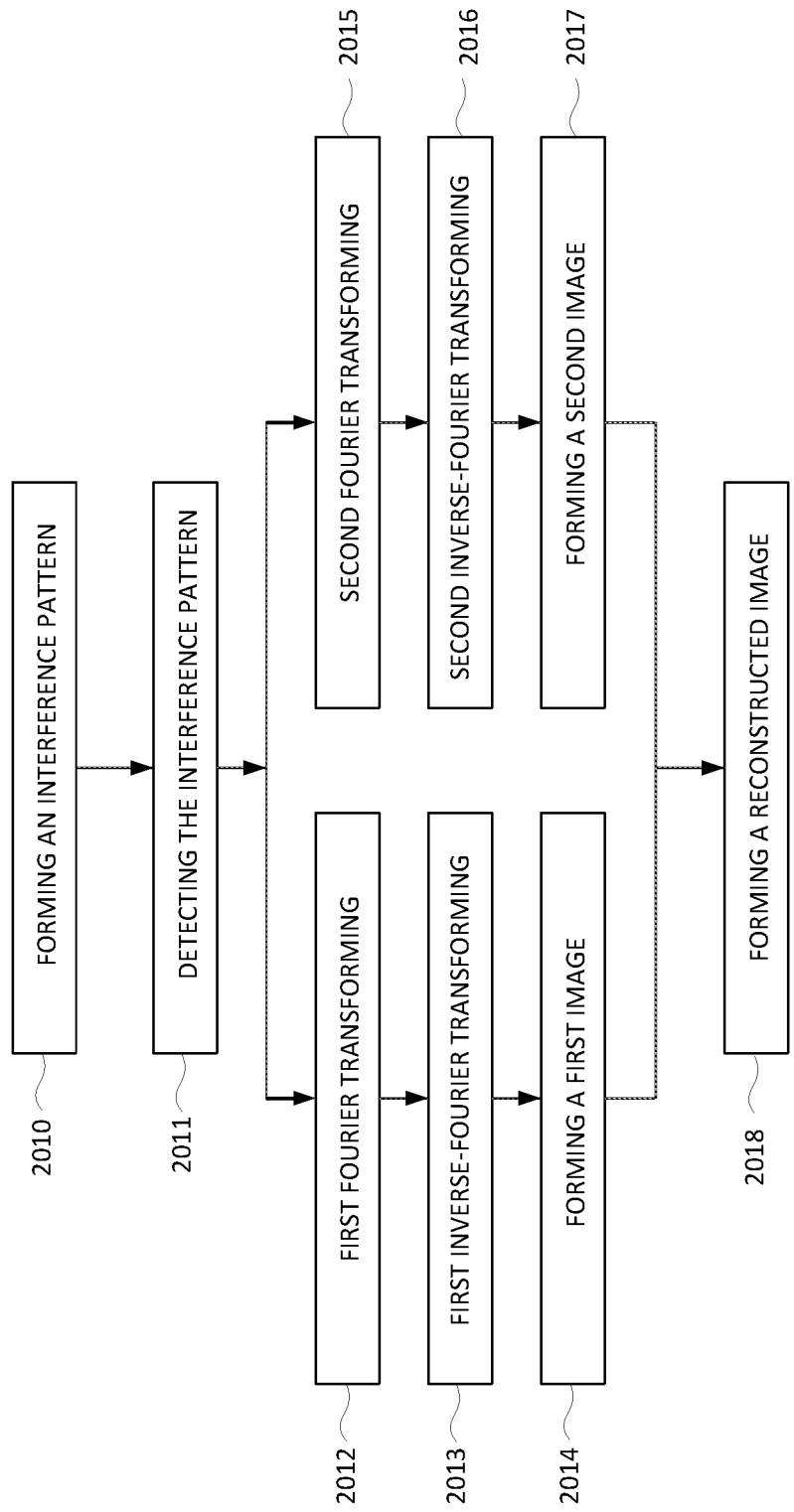
FIG. 7 is a flowchart exemplary illustrating an overview of an algorithm for HDR image reconstruction with parallel processing.

Referring to FIG. 7, the process of image reconstruction illustrated in FIG. 6 is now described in more detail. More specifically, in FIG. 7, at step 2010 the apparatus 100 is used to generate an interference pattern and obtain a holographic image. In step 2011, the interference pattern is detected with a detector having a plurality of regions and sub-regions thereof of which sensitivity are different from each other.

In step 2012, a first Fourier transform (FT) is performed. A first data, which is detected by a plurality of the first sub-regions (1010 in FIG. 3A, 1110 in FIG. 3B) of the detector, is transformed, in order to obtain a first Fourier spectrum including a first-order diffracted light.

In step 2013, a first inverse-Fourier transforming is executed. The first-order diffracted light of the first Fourier spectrum is transformed to obtain a first amplitude data and a first phase data for each of the first and second sub-regions.

In step 2014, a first image is formed by using the first amplitude data for each of the first and second sub-regions, and a first portion having an amplitude value more than a threshold value will be removed from the first image. One example for determining a threshold value is the use of irradiance values detected by each sub-region (pixel). Specifically, for example, when the irradiance value A for a green pixel G1 is lager than a preset value (e.g., $A^{1/2}$) the irradiance for that pixel is removed. That is, the threshold value used may be for example $A^{1/2}$ or $B^{1/2}$ (where A and B are the irradiance levels shown in FIG. 2B). At step 2014, in the first image, the amplitude information of the first portion can be set to zero value. The first image data can be formed based on the first phase data, and the first phase data of the first portion can be removed from the first image.

In step 2015, a second Fourier transforming is executed. A second data, which is detected by a plurality of the second sub-regions (1020 in FIG. 3A, 1120 in FIG. 3B) of the detector, is transformed in order to obtain a second Fourier spectrum including a first-order diffracted light.

In step 2016, a second inverse-Fourier transforming is executed. The first-order diffracted light of the second Fourier spectrum is transformed to obtain a second amplitude data and a second phase data for each of the first and the second sub-regions.

In step 2017, a second image is formed by using the second amplitude data for the first portion. When an amplitude value of a second portion of the second image is more than a threshold value, the second portion can be removed from the second image. The second image data can be formed based on the second phase data, and the second phase data of the second portion can be removed the second image.

In step 2018, a reconstructed image of the object is formed by using the first and second images. The second image can be integrated with the first image to form the reconstructed image. After the step 2018, a numerical focusing process can be added. To that end, a numerical focusing process may be used. The numerical focusing is a calculation method for an optical propagation of the electric field. The following equations show one example for the calculation, which propagates the electric field v(x, y) from z=0 to z=z. This method is called as the propagation of the angular spectrum. v(x, y, 0) means the electric field at z=0. The first equation (Equation 4) is a Fourier transform, so V($\alpha$, $\beta$, 0) is a spectrum of v(x, y, z). The second equation (Equation 5) is an inverse Fourier transform after applying the phase factor exp[i*2π/λ*sqrt(1−$\alpha$^2−$\beta$^2)] for propagation. Then, v(x, y, z) is the electric field at z=z as a result.

$$V\left(\frac{\alpha}{\lambda}, \frac{\beta}{\lambda}, 0\right) = \int\int v(x, y, 0)\exp\left[-i2\pi\left(\frac{\alpha}{\lambda}x + \frac{\beta}{\lambda}y\right)\right]dxdy \quad \text{Equation (4)}$$

$$v(x, y, z) = \quad \text{Equation (5)}$$
$$\int\int V\left(\frac{\alpha}{\lambda}, \frac{\beta}{\lambda}, 0\right)\exp\left[i\frac{2\pi}{\lambda}\sqrt{1-\alpha^2-\beta^2}\,z\right]circ\left(\sqrt{\alpha^2+\beta^2}\right)$$
$$\exp\left[i2\pi\left(\frac{\alpha}{\lambda}x+\frac{\beta}{\lambda}y\right)\right]d\frac{\alpha}{\lambda}d\frac{\beta}{\lambda}$$

where (x, y, z) are coordinates of a location in real space, ($\alpha$, $\beta$) are coordinates of a location in Fourier space, and λ is the wavelength of light being used.

When each region of the detector has a third sub-region (1140 in FIG. 3B) of which sensitivity is different from the first and second sub-regions, a third Fourier transforming can be executed before forming the reconstructed image. A third data set, which is detected by a plurality of the third sub-regions of the detector is transformed, in order to obtain a third Fourier spectrum including a first-order diffracted light. Then, a third inverse-Fourier transforming process can be executed. The first-order diffracted light of the third Fourier spectrum is transformed to obtain a third amplitude data and a third phase data for each of the first, second, and third sub-regions. A third image can be formed by using the third amplitude data for each of the first and second sub-regions. The reconstructed image of the object can be formed by using the first, second, and third images. In FIG.

3B, sensitivity of a fourth sub-region 1130 can be the same as the sensitivity of the first sub-region 1110.

The first, second, and third sub-regions (1110, 1120,1130) can be associated with areas of a color filter in green, red, and blue, respectively.

Figure 8:
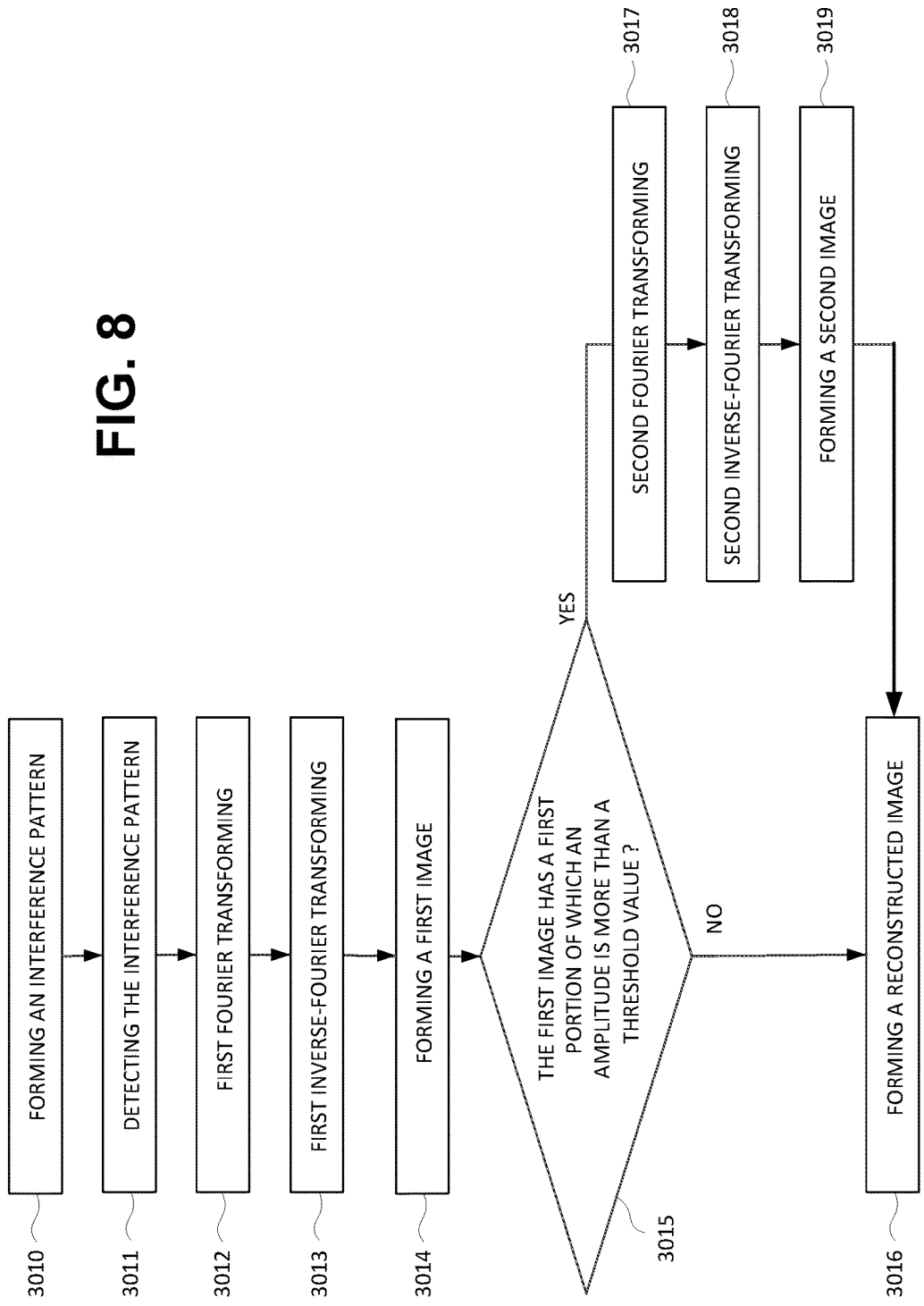
FIG. 8 is a flowchart exemplary illustrating an overview of an algorithm for determining whether a portion of an image includes an amplitude higher than a threshold value.

As described in FIG. 8, if the first image has a first portion of which an amplitude value is more than a threshold value (YES in step 3015), the second FOURIER transforming, the second inverse-FOURIER transforming, and the second image forming can be executed in steps 3017, 3018, 3019. And then, the reconstructed image can be formed in step 3016. Steps 3010, 3011, 3012, 3013, 3014, 3017, 3018, 3018, 3019, and 3016 can be executed in a same manner as FIG. 7. If the first image has a first portion of which an amplitude value is less than a threshold value (NO in step 3015), the sub-region is not changed and the reconstructed image (at step 3016) is formed with the original irradiance value.

Turning now to FIGS. 9A through 12B examples of image reconstruction in accordance with the present invention are described.

Figure 9A:
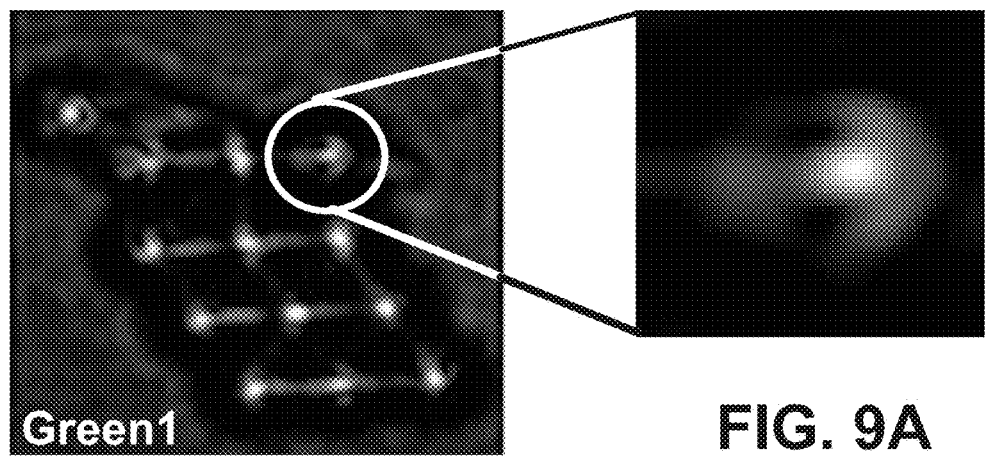
FIGS. 9A, 9B and 9C illustrate a first example of reconstruction of a holographic image in standard, equalized and HDR reading, respectively, and zoomed insets thereof.
Figure 9B:
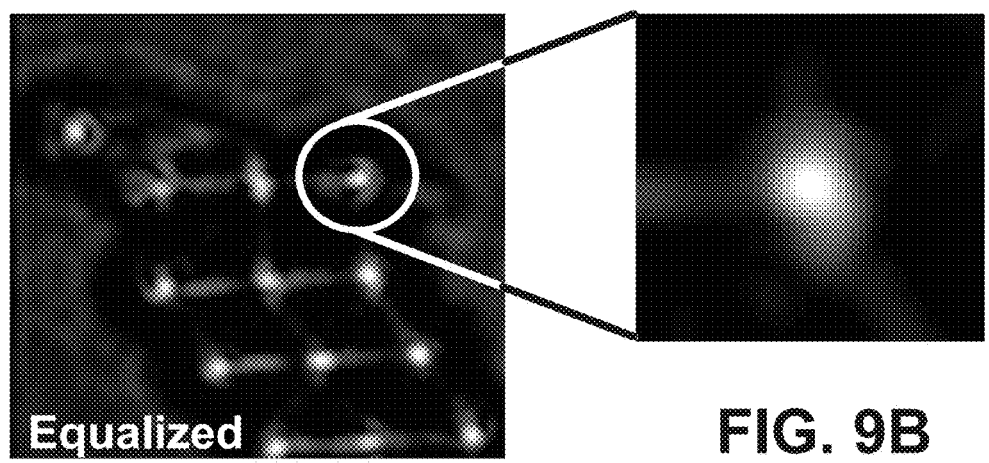
Figure 9C:
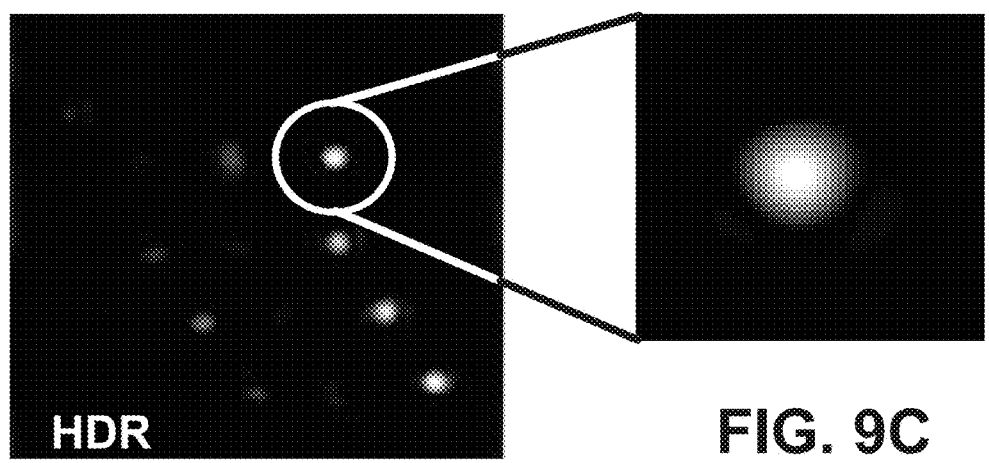

FIGS. 9A to 9C illustrate a first example of reconstructions of a holographic image in standard, equalized and HDR reading, respectively, and zoomed insets thereof. More specifically, FIGS. 9A to 9C are Saguaro reconstructions of a holographic image. The circled regions of interest (ROIs) are magnified on the inset of each image. The Green1 and Equalized ROI appear substantially identical in the unmagnified pictures. However, differences masked by limited display resolution are revealed in the magnified inset images. For the sake of better illustration, the brightness range (contrast resolution) of the HDR picture (FIG. 9C) is enhanced, the bright drops are not thresholded and so that the drops on the left of the picture are seen to be much dimmer.

Figure 10A:
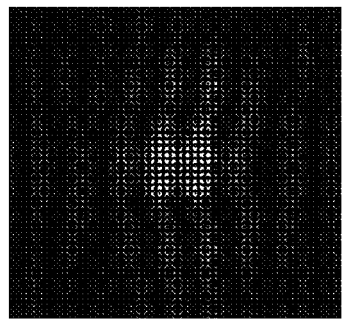
FIGS. 10A, 10B and 10C respectively illustrate detected images in Green1, Red and Blue channels of an RGB filter.
Figure 10D:
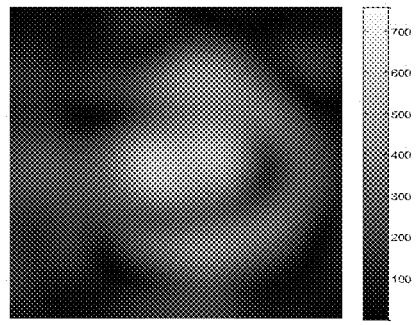
FIGS. 10D, 10E and 10F illustrate reconstructed amplitude images thereof, as a second example.
Figure 10B:
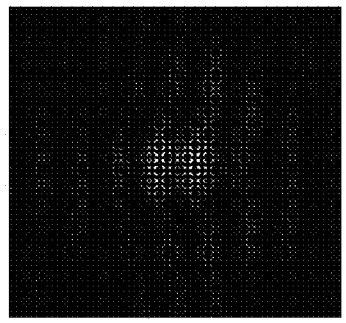
Figure 10E:
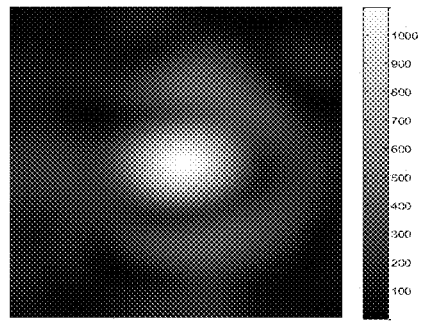
Figure 10C:
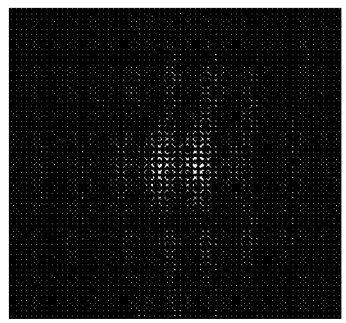
Figure 10F:
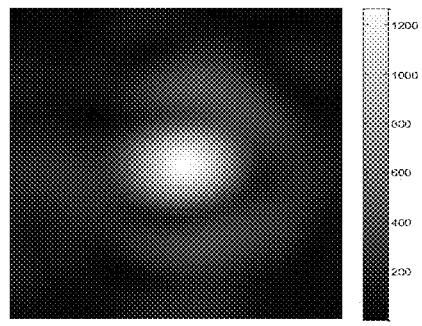

As a second example, FIGS. 10A, 10B and 10C show green1, red and blue signals respectively obtained at process steps 1001, 1003, 1004 of FIG. 6, respectively. FIGS. 10D, 10E and 10F illustrate the reconstructed amplitudes of green1, red and blue signals respectively. FIGS. 10D, 10E and 10F respectively represent the results of process steps 5001, 5003 and 5004 of FIG. 6.

Figure 11A:
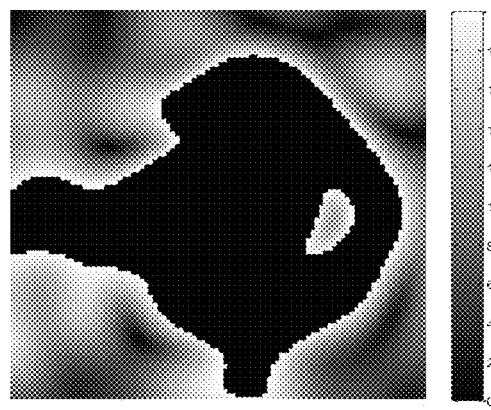
FIGS. 11A, 11B and 11C illustrate an HDR reconstruction example using range-clipped tonal rendering curves.
Figure 11B:
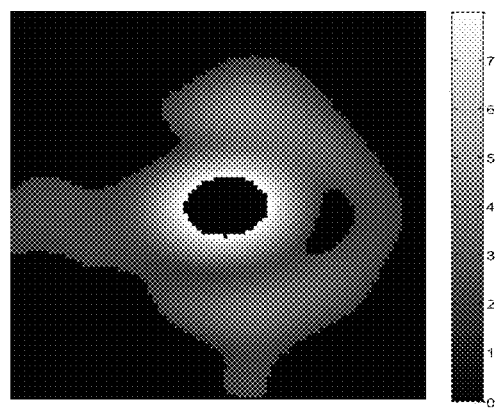
Figure 11C:
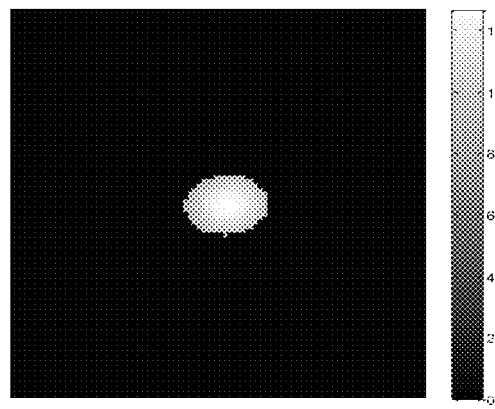

FIGS. 11A, 11B and 11C show the portions at Irradiance<A, A<Irradiance<B and B<Irradiance, respectively. More specifically FIGS. 11A, 11B and 11C illustrate results of filtering the FIGS. 10D to 10F with the range-clipped tonal rendering curves illustrated in FIG. 2B, which filtering is based on the weighting function of Equation (3) for each respective color.

Figure 12A:
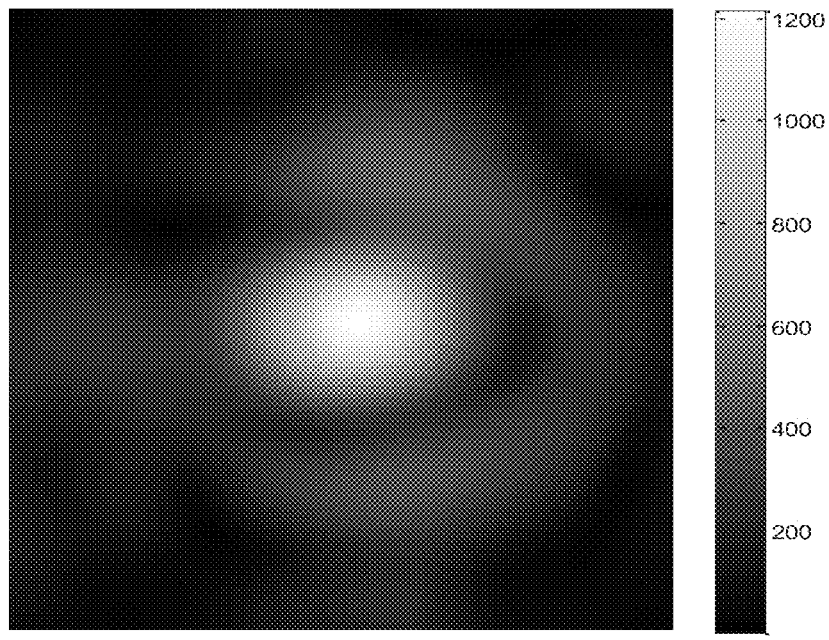
FIGS. 12A to 12B respectively illustrate amplitude and phase image results of a reconstructed image.
Figure 12B:
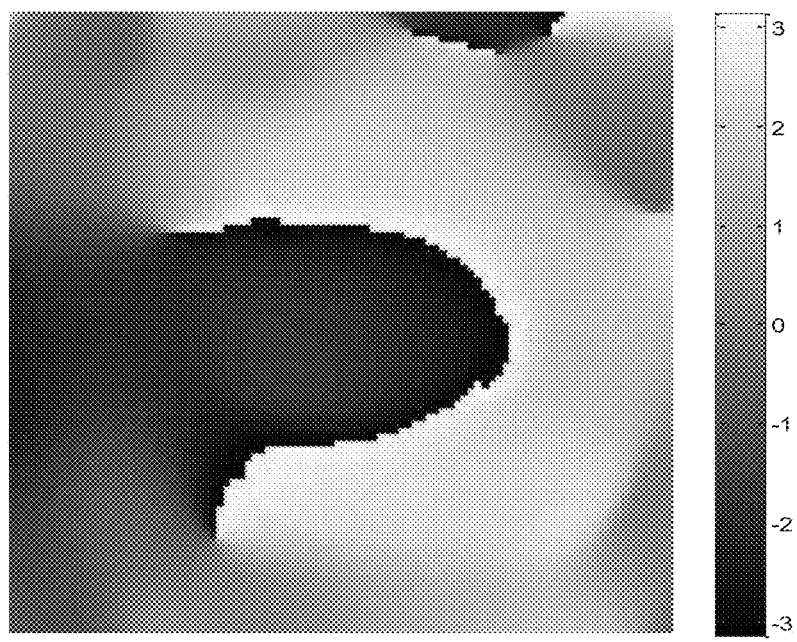

Finally, FIG. 12A shows the amplitude of the integrated reconstructed image; and FIG. 12B shows the phase of the integrated reconstructed image. That is, FIGS. 12A and 12B respectively illustrate intensity and phase reconstructed images as defined by Equation (2), and the integration defined by Equations (4) and (5).

Figure 13:
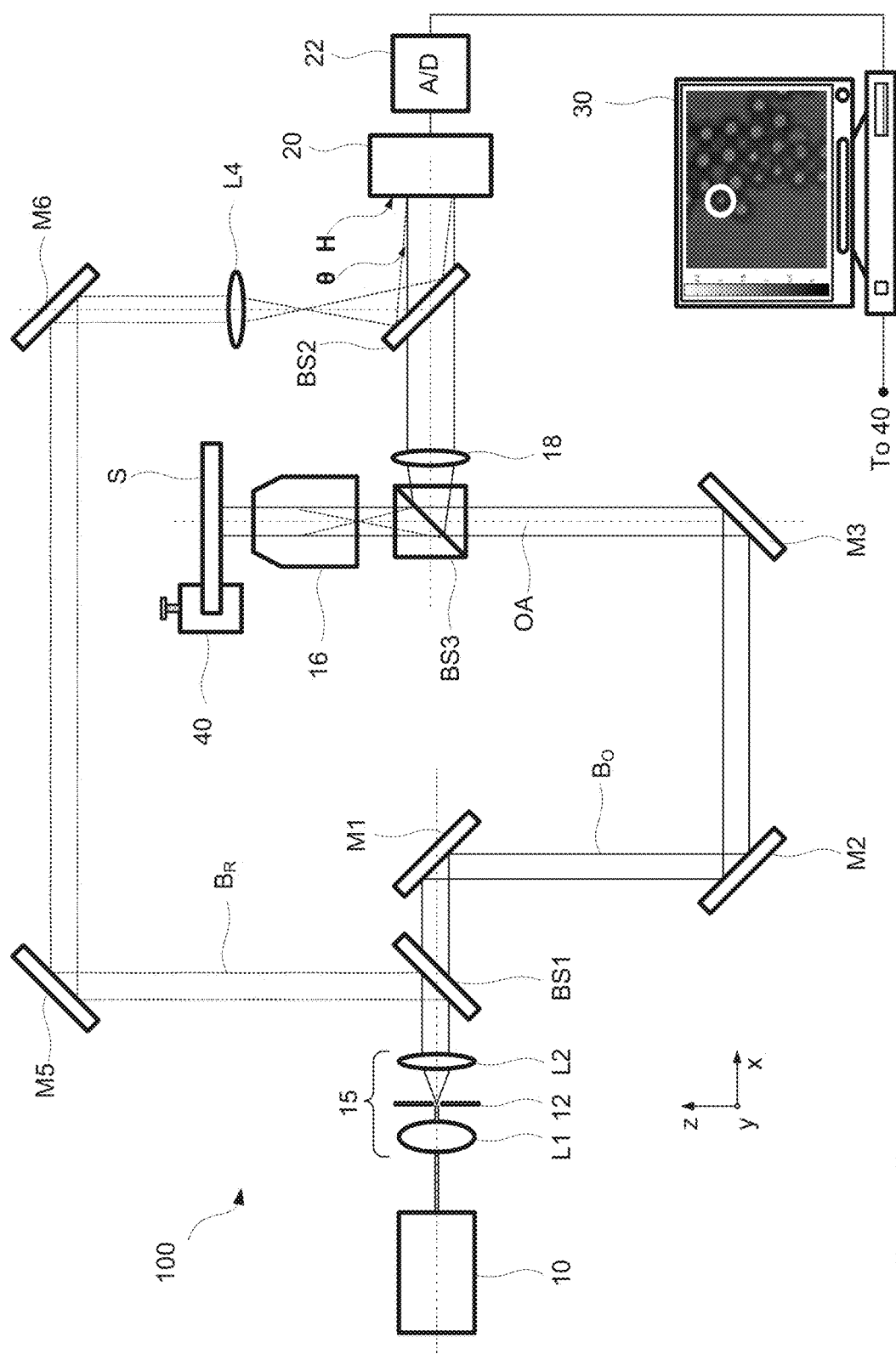
FIG. 13 is a diagram that illustrates an arrangement of an optical apparatus for obtaining holographic images of a sample, and for performing image reconstruction on the image of the sample, according to a second embodiment of the present invention.

FIG. 13 illustrates an arrangement of an optical apparatus for obtaining holographic images of a sample, and for performing image reconstruction on the image of the sample, according to a second embodiment of the present invention. The apparatus 100 of the second embodiment illustrated in FIG. 9 is substantially similar to the apparatus 100 described in the first embodiment of FIG. 1. Accordingly, in the second embodiment, unnecessary description is obviated to avoid repetition, and only relevant differences are described herein. Specifically, in the second embodiment, the object beam $B_O$ is not transmitted through the sample S; instead, the object beam $B_O$ is reflected from a surface of the sample S. The mode of operation, holographic recording and reconstruction of holograms in both embodiments does not change. One notable difference in the second embodiment, as compared to the first embodiment, is that mirror M4 of FIG. 1 has been removed, and a beam splitter BS3 is used instead to guide light reflected from a surface of sample S towards the detector 20.

Advantageously, in the reflection mode of FIG. 13, the E-field phase image corresponds to the surface morphology, surface contour, surface roughness, or topography of the sample S. In this manner, for example, when a surface of a thin waveplate sample or a semiconductor substrate is coated with certain patterns, features indicative of such patterns can be measured with high accuracy. It is a matter of course therefore that the transmission configuration of the first embodiment (FIG. 1) or the reflection configuration of the second embodiment (FIG. 13) can give the same advantageous benefits in terms of reconstructing holographic images in high dynamic range.

While the embodiments according to the present invention have been described with reference to exemplary embodiments, it is to be understood that the present invention is not limited to the above described embodiments. The scope of the following claims is to be accorded the broadest interpretation so as to encompass all such modifications and equivalent structures and functions.

What is claimed is:

1. An image reconstructing method comprising:
    detecting an interference pattern with a detector having a plurality of regions, each region including a first sub-region and a second sub-region of which sensitivity is different from the first sub-region, the interference pattern formed by interference of a reference beam and an object beam, the object beam including information about an object;
    dividing the interference pattern into a first interlaced interference pattern and a second interlaced interference pattern respectively corresponding to the interference pattern detected by the first and second sub-regions of the detector;
    obtaining a first Fourier spectrum of the first interlaced interference pattern by performing a Fourier transform on interlaced interference signals detected by the first sub-regions of the detector, the first Fourier spectrum including a zeroth-order spectrum, a first-order spectrum, and a replica of the first-order spectrum of the interlaced interference signals detected by each of the sub-regions;
    obtaining a second Fourier spectrum of the second interlaced interference pattern by performing a Fourier transform on interlaced interference signals detected by the second sub-regions of the detector, the second Fourier spectrum including a zeroth-order spectrum, a first-order spectrum, and a replica of the first-order spectrum of the interlaced interference signals detected by the second sub-regions;
    extracting, using a band-pass filter, the first-order spectrum from each of the first Fourier spectrum and the second Fourier spectrum;
    obtaining first amplitude data by performing an inverse Fourier transform on the first-order spectrum extracted from the first Fourier spectrum;
    obtaining second amplitude data by performing an inverse Fourier transform on the first-order spectrum extracted from the second Fourier spectrum;

selecting, for each of the first and second sub-regions of the detector, one amplitude value lower than a threshold value out of the first amplitude data and the second amplitude data; and reconstructing an image of the object using the selected amplitude values lower than the threshold value, wherein, for each of the first and second sub-regions of the detector, the processor replaces the first amplitude data and the second amplitude data with the selected one amplitude value lower than the threshold value to reconstruct the image of the object.

2. The image reconstructing method according to claim 1, wherein each region further including a third sub-region of which sensitivity is different from the first and second sub-regions, and the method further comprising:

dividing the interference pattern into a third interlaced interference pattern corresponding to the interference pattern detected by the third sub-regions of the detector;

obtaining a third Fourier spectrum of the third interlaced interference pattern by performing a Fourier transform on interlaced interference signals detected by the third sub-regions of the detector, the third Fourier spectrum including a zeroth-order spectrum, a first-order spectrum, and a replica of the first-order spectrum of the interlaced interference signals detected by the third sub-regions;

extracting, using the band-pass filter, the first-order spectrum from the third Fourier spectrum; and obtaining third amplitude data by performing an inverse Fourier transform on the first-order spectrum extracted from the third Fourier spectrum.

3. The image reconstructing method according to claim 2, wherein the selecting includes, for each sub-region of the plurality of regions of the detector, selecting one amplitude value lower than a threshold value out of the first, second and third amplitude data, and wherein reconstructing the image of the object includes, for each of the plurality of regions of the detector, replacing the amplitude data of the first sub-region, the amplitude data of the second sub-region and the amplitude data of the third sub-region with the selected one amplitude value lower than the threshold value.

4. The image reconstructing method according to claim 2, wherein each region further including a fourth sub-region of which sensitivity is similar to the third sub-region and different from the first and second sub-regions, and the method further comprising:

dividing the interference pattern into a fourth interlaced interference pattern corresponding to the interference pattern detected by the fourth sub-regions of the detector;

obtaining a fourth Fourier spectrum of the fourth interlaced interference pattern by performing a Fourier transform on interlaced interference signals detected by the fourth sub-regions of the detector, the fourth Fourier spectrum including a zeroth-order spectrum, a first-order spectrum, and a replica of the first-order spectrum of the interlaced interference signals detected by the fourth sub-regions;

extracting, using the band-pass filter, the first-order spectrum from the fourth Fourier spectrum;

obtaining fourth amplitude data by performing an inverse Fourier transform on the first-order spectrum extracted from the fourth Fourier spectrum, wherein the selecting includes, for each sub-region of the plurality of regions of the detector, selecting one amplitude value lower than a threshold value out of the amplitude data of the first sub-region, the amplitude data of the second sub-region, the amplitude data of the third sub-region, and the amplitude data of the fourth sub-region, and wherein reconstructing the image of the object includes, for each of the plurality of regions of the detector, replacing each of the amplitude data of the first sub-region, the amplitude data of the second sub-region, the amplitude data of the third sub-region and the amplitude data of the fourth sub-region with the selected one amplitude value lower than the threshold value.

5. The image reconstructing method according to claim 2, wherein the interference pattern is generated by off-axis holography.

6. The image reconstructing method according to claim 1, further comprising setting, for each region of the plurality of regions of the detector, one phase value, which is associated with the selected one amplitude value lower than the threshold value.

7. An image reconstructing apparatus comprising:

a detector configured to detect an interference pattern formed by interference of reference and object beams, the object beam including information about an object, the detector having a plurality of regions, and each region including a first sub-region and a second sub-region of which sensitivity is different from the first sub-region; and a processor configured to form a reconstructed image of the object;

wherein the processor is configured to:

divide the interference pattern into a first interlaced interference pattern and a second interlaced interference pattern respectively corresponding to the interference pattern detected by the first and second sub-regions of the detector;

obtain a first Fourier spectrum of the first interlaced interference pattern by performing a Fourier transform on interlaced interference signals detected by the first sub-regions of the detector, the first Fourier spectrum including a zeroth-order spectrum, a first-order spectrum, and a replica of the first-order spectrum of the interlaced interference signals detected by the first sub-regions;

obtain a second Fourier spectrum of the second interlaced interference pattern by performing a Fourier transform on interlaced interference signals detected by the second sub-regions of the detector, the second Fourier spectrum including a zeroth-order spectrum, a first-order spectrum, and a replica of the first-order spectrum of the interlaced interference signals detected by the second sub-regions;

extract, using a band-pass filter, the first-order spectrum from each of the first Fourier spectrum and the second Fourier spectrum;

obtain first amplitude data for the first sub-regions by performing an inverse Fourier transform of the first-order spectrum extracted from the first Fourier spectrum;

obtain second amplitude data by performing an inverse Fourier transform of the first-order spectrum extracted from the second Fourier spectrum;

select, for each of the first and second sub-regions of the detector, one amplitude value lower than a threshold value out of the first amplitude data and the second amplitude data; and reconstruct an image of the object using the selected amplitude values lower than the threshold value, wherein, for each of the first and second sub-regions of the detector, the processor replaces the first amplitude data and the second amplitude data with the selected one amplitude value lower than the threshold value to reconstruct the image of the object.

8. An image reconstructing method comprising:

detecting an interference pattern with a detector having a plurality of pixel regions, each pixel region including a first pixel and a second pixel of which sensitivity is different from the first pixel, the interference pattern formed by interference of a reference beam and an object beam, the object beam including information about an object;

dividing the interference pattern into a first interlaced interference pattern and a second interlaced interference pattern respectively corresponding to the interference pattern detected by the first and second pixels of the detector;

obtaining a first Fourier spectrum of the first interlaced interference pattern by performing a Fourier transform on interlaced interference signals detected by the first pixels included in each pixel region of the detector, the first Fourier spectrum including a zeroth-order spectrum, a first-order spectrum, and a replica of the first-order spectrum of the interlaced interference signals detected by the first pixels;

obtaining a second Fourier spectrum of the second interlaced interference pattern by performing a Fourier transform on interlaced interference signals detected by the second pixels included in each pixel region of the detector, the second Fourier spectrum including a zeroth-order spectrum, a first-order spectrum, and a replica of the first-order spectrum of the interlaced interference signals detected by the second pixels;

extracting, using a band-pass filter, the first-order spectrum from each of the first Fourier spectrum and the second Fourier spectrum;

obtaining first amplitude data by performing an inverse Fourier transform on the first-order spectrum extracted from the first Fourier spectrum;

obtaining second amplitude data by performing an inverse Fourier transform on the first-order spectrum extracted from the second Fourier spectrum;

selecting, for each pixel of the detector, one amplitude value corresponding to one pixel out of the first amplitude data and the second amplitude data, the selected amplitude value being lower that a threshold value; and reconstructing an image of the object using the selected amplitude values lower than the threshold value selected for each pixel, wherein reconstructing the image of the object includes, for each of the plurality of pixels of the detector, replacing the amplitude data of a pixel having amplitude data higher than the threshold value with the selected one amplitude value lower than the threshold value.

9. The image reconstructing method according to claim 8, wherein obtaining amplitude data for each pixel includes obtaining amplitude data for one or more of a green pixel, a red pixel and a blue pixel included in each pixel region of the detector, wherein the amplitude data corresponds to irradiance data having $0<\text{irradiance}<A$ for a pair of green pixel signals (G1, G2), $A<\text{irradiance}<B$ for a red pixel signal (R), and $B<\text{irradiance}<C$ for a blue pixel signal (B), where $0<A<B<C$, and wherein reconstructing the image of the object includes integrating the green, red and blue pixel signals to form a high dynamic range image ($U_{HDR}$) according to the following formula:

$$u_{HDR} = w_{G1}u_{G1} + w_{G2}u_{G2} + w_R u_R + w_B u_B$$

where W is a weighting function, and U is a function proportional to the irradiance incident on each pixel.

* * * * *